(12) United States Patent
Miyamoto et al.

(10) Patent No.: US 6,703,755 B2
(45) Date of Patent: Mar. 9, 2004

(54) BRUSH-EQUIPPED MOTOR AND METHOD OF EXCHANGING BRUSHES THEREOF

(75) Inventors: Shinichi Miyamoto, Kyoto (JP); Tadashi Yasui, Kyoto (JP)

(73) Assignee: Japan Storage Battery Co., Ltd., Kyoto (JP)

(*) Notice: Subject to any disclaimer, the term of this patent is extended or adjusted under 35 U.S.C. 154(b) by 0 days.

(21) Appl. No.: 10/235,792

(22) Filed: Sep. 6, 2002

(65) Prior Publication Data

US 2003/0048027 A1 Mar. 13, 2003

(30) Foreign Application Priority Data

Sep. 10, 2001 (JP) .................................. P. 2001-273083

(51) Int. Cl.[7] ................................................ H02K 13/00
(52) U.S. Cl. ....................................................... 310/239
(58) Field of Search ................................. 310/239, 240, 310/242; H02K 13/00

(56) References Cited

U.S. PATENT DOCUMENTS 4,075,523 A * 2/1978 Lafferty, Sr. ................. 310/239

6,394,191 B1    5/2002   Nakane

FOREIGN PATENT DOCUMENTS

DE    42 03 070 A 1    * 8/1993 .......... H02K/13/00

* cited by examiner

*Primary Examiner*—Nicholas Ponomarenko
*Assistant Examiner*—Nguyen N Hanh
(74) *Attorney, Agent, or Firm*—Sughrue Mion, PLLC (57) ABSTRACT

It is to provide a brush-equipped motor enabled to be used for a long time without performing operations and without interruption even when the brush wears out. When a rotor is caused to perform a turning operation, cam projections similarly start to perform a turning operation. Then, an abutting part, at which each of the cam projections contacts with a spring piece part of a corresponding one of the first brushes, gradually moves to an end of the first brush. Thus, the spring piece part of each of the first brushes is gradually and elastically deformed in a direction in which brush bodies come away from a commutator. When the turning operation continues still more, an end of each of the second brushes comes off a corresponding one of the cam projections, so that the brush bodies thereof contact with the surface of the commutator.

13 Claims, 5 Drawing Sheets

BRUSH-EQUIPPED MOTOR AND METHOD OF EXCHANGING BRUSHES THEREOF

BACKGROUND OF THE INVENTION

The present invention relates to a brush-equipped motor.

Such a kind of a motor is configured so that, for example, a commutator is provided at a rotor side, that a brush is provided at a stator side, and that this brush is slidably contacted with the commutator to thereby electrically conduct an external power supply circuit, which is connected to the brush, to a driving coil that is connected to the commutator and wound around the rotor. Thus, electric current is periodically supplied to the driving coil. Consequently, magnetic field action between such a coil and a field magnet drives the rotor to rotate.

Meanwhile, in the case of such a kind of a motor, when frequently repeating start/stop, sparks generated between the commutator and the brush at that time cause the brush to wear out. Then, such a kind of a motor causes problems in that the commutator and the brush are brought into a non-contact state, and that thus the motor cannot be driven. In such a case, the conventional brush-equipped motor is not configured so that only a worn-out brush can be exchanged. Eventually, a manufacturer needs to collect products and to replace each of the motors itself with a new one. That is, the conventional brush-equipped motor has a drawback that the life thereof ends when the brush wears out.

SUMMARY OF THE INVENTION

The present invention is accomplished in view of the aforementioned circumstances. An object of the present invention is to provide a brush-equipped motor enabled to be used for a long time without performing operations, such as replacement of a motor, and without interruption even when the brush wears out.

To accomplish the above object of the present invention, according to a first aspect of the present invention, there is provided a brush-equipped motor, comprising: a rotor; a commutator provided at a side of the rotor; a stator; brushes provided at a side of the stator; reserve-brushes provided at the side of the stator; and a brush exchanging mechanism having projections, wherein the brush exchanging mechanism is changed the brush-equipped motor from a first state in which the brushes are in contact with the commutator and the reserve-brushes are detached from the commutator by the projections, to a second state in which the brushes are detached from the commutator by the projections and the reserve-brushes are in contact with the commutator.

According to a second aspect of the present invention, there is provided a brush-equipped motor as set forth in the first aspect of the present invention, wherein each of the brushes and the reserve-brushes has: a brush body slidably contacted with the commutator, and an elastic piece attached to the brush body and arranged in a circumferential direction of the commutator, wherein the brush exchanging mechanism has a rotary body adapted to perform a turning operation concentrically with the rotor; and the projections have a plurality of projections being in contact with each of the elastic pieces of the brushes and the reserve-brushes and provided on the rotary body, wherein in the first state, by turning the rotary body, the elastic pieces of the reserve-brushes contact with the projections to thereby prevent the brush bodies thereof from being in contact with the commutator, and in the second state, the elastic pieces of the brushes contact with the projections to thereby prevent the brush bodies thereof from being in contact with the commutator.

According to a third aspect of the present invention, there is provided a brush-equipped motor as set forth in the second aspect of the present invention, wherein in the first state, the elastic pieces of the brushes contact with the projections to thereby regulate an amount of displacement of each of the brush bodies to the commutator side, which is caused owing to wear of the brush bodies thereof, and in the second state, the elastic pieces of the reserve-brushes contact with the projections to thereby regulate an amount of displacement of each of the brush bodies to the commutator side, which is caused owing to wear of the brush bodies thereof.

In the present invention, it is preferable that a brush-equipped motor as set forth in the first aspect, wherein each of the projections have a cam shape having a surface contacting with the brushes and the reserve brushes and constituted by a curved part having a gentle gradient.

It is also preferable that a method of exchanging brushes of a brush-equipped motor, method of exchanging brushes of a brush-equipped motor, comprising steps of: preparing brushes provided at a side of a stator of the brush-equipped motor, reserve-brushed provided at the side of the stator and a commutator provided at a side of a rotor of the brush-equipped motor; changing a state of the motor from a first state, in which each of the brushes are in contact with the commutator, and the reserve-brushes are detached from the commutator by projections, to a second state, in which the projections are moved, and the brushes are detached from the commutator by the projections, and the reserve-brushes are in contact with the commutator.

With a configuration of the first aspect of the present invention, first, the brush-equipped motor is put into a first state in which the reserve-brushes are detached from the commutator, and in which only the brushes are in contact with the commutator. In the case that the motor is used in this state for a long term, actually, the brushes wear out owing to slidably contact between the commutator and each of the brushes. Thus, the brush exchanging mechanism changes the state of the brush-equipped motor to a second state in which the brushes are detached from the commutator, and in which the reserve-brushes are in contact with the commutator. Thus, the worn-out brushes can be exchanged with the reserve-brushes. Consequently, the motor can be used still more until the reserve-brushes wear. Therefore, such a simple operation enables the continuing use of the motor can be used for a long time being longer than the time, during which the aforementioned conventional brush-equipped motor can be used, without performing an operation of exchanging the motor.

With a configuration of the second aspect of the present invention, as the rotary body turns, the projections provided on the rotary body abut the elastic pieces of the reserve-brushes to thereby prevent the brush bodies thereof from being in contact with the commutator. Consequently, the motor is brought into the first state in which the brushes come into contact with the commutator and in which the reserve-brushes are detached from the commutator. When the rotary body is turned during such a state, the projections of the rotary body contact with the elastic pieces of the brushes this time to thereby prevent the brush bodies thereof from coming in contact with the commutator. That is, for example, the brushes are prevented from being destroyed by a shock that is caused by abruptly releasing the elastic pieces. Consequently, the state of the motor is changed into a second state in which the brushes are detached from the commutator, and in which the reserve-brushes are in contact with the commutator. Hence, the brushes can be easily exchanged to the reserve-brushes only by performing a simple turning operation of the rotary body.

In the case that the motor is used for a long time, the commutator is sometimes damaged by, for example, brushes, which become difficult to abrade and harder than the brushes before wearing-out, and by exposed elastic pieces. In such a case, it is insufficient to exchange only the brushes. Eventually, the motor itself should be replaced with a new one. Thus, according to the third aspect of the present invention, in the first state, the projections of the rotary body are made to contact with the elastic pieces of the brushes, which are currently used. Consequently, an amount of displacement thereof to the commutator, which is caused by the wear-out of the brush bodies, is regulated. Thus, even in the case that the motor is used for a long term, the brush bodies are prevented from coming in contact with the commutator before excessively worn out. Consequently, the commutator can be prevented from being damaged.

DETAILED DESCRIPTION OF THE PREFERRED EMBODIMENTS

An embodiment of the present invention is described by referring to FIGS. 1 to 5F.

Figure 1:
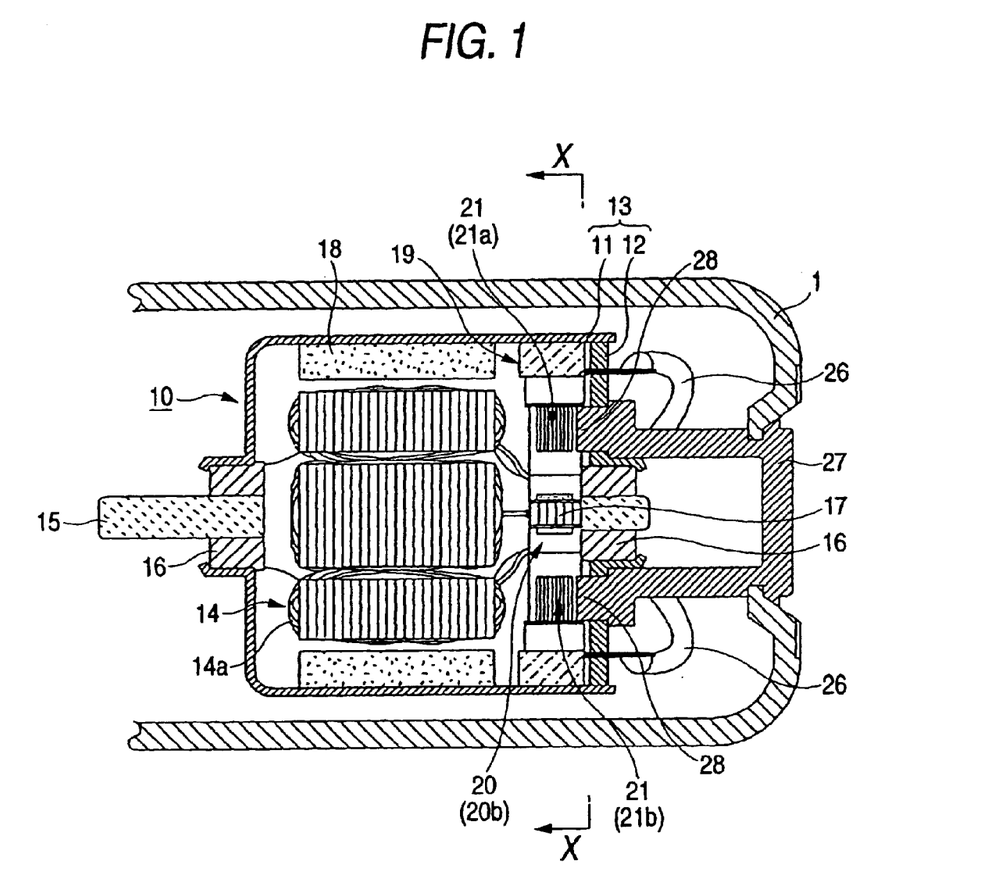
FIG. 1 is a sectional view illustrating the entire brush-equipped motor according to an embodiment of the present invention.

A brush-equipped motor (hereunder referred to as a "motor 10") of the present invention is incorporated into, for example, an electric drill 1. When an operator pushes a predetermined activating button (not shown) by a finger, a rotation shaft 15 of the motor 10 turns to thereby cause a drill part to turn. Further, when the operator releases the finger from the activating button, the rotation shaft 15 operates in such a manner as to stop the drill part. The motor 10 is configured so that a rotor 14 (corresponds to the "rotor" of the first aspect of the present invention), around which a plurality of drive coils 14a are wound, is accommodated in a housing 13 (corresponds to the "stator" of the first aspect of the present invention) consisting of a motor case 11, which is opened at an end, and an end plate 12 to be fitted to such an opening part. The rotor 14 is turnably placed by being supported through bearings 16, 16 respectively provided in a closing part of the motor case 11 and the end plate 12. Moreover, a commutator 17 (corresponding to the "commutator" of the first aspect of the present invention) is provided at an end of the rotation shaft 15, which is placed at the side of the end plate 12. The commutator 17 is electrically connected to the drive coil 14a. On the other hand, a cylindrical magnet 18 is disposed on the inner wall of the motor case 11 through an air-gap provided between the magnet 18 and the rotor 14. Furthermore, a brush holder 19 is provided at the side of a side surface of the end plate 12, which surface is placed at the side of the rotor 14. Brushes provided in the brush holder 19 slidably contact with the surface of the commutator 17 to thereby energize a power supply circuit (not shown), which is connected to the brushes, and the drive coil 14 connected to the commutator 17. Thus, electric current periodically flows through the drive coil 14a. Consequently, the rotor 14 can be driven by a magnetic action, which acts between the rotor 14 and the magnet 18 provided on the motor case 11, to rotate.

Next, the brush holder 19, which is a characterizing part of the present invention, is described hereinbelow.

Figure 2:
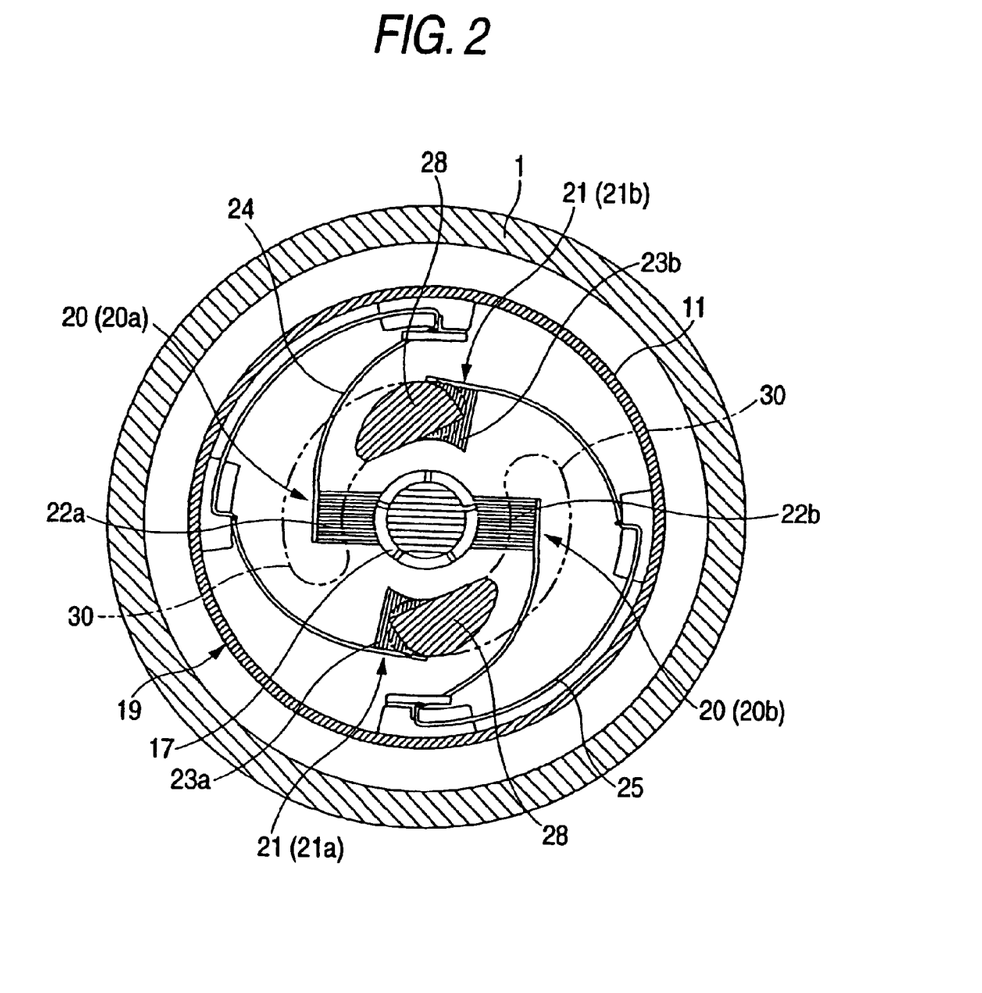
FIG. 2 is a sectional view illustrating the brush-equipped motor, which is taken in the direction of arrows along line X—X of FIG. 1.

As illustrated in FIG. 2, the brush holder 19 is shaped nearly like a cylinder. Each of a pair of brushes (hereunder referred to "first brushes" 20, 20) is extended from a corresponding position, at which this first brush 20 faces the other of the first brushes 20, in such a way as to bend so that the commutator 17 is entrained in the same direction by the first brushes 20, 20. More particularly, one brush 20a of the paired first brushes 20 and one brush 21a of the paired second brushes 21 respectively have brush bodies 22a and 23a, each of which is attached to a corresponding one of both ends of an elongated spring piece 24 (corresponding to the "elastic piece" of the second aspect of the present invention) having a central part securely fixed along the inner wall surface of the brush holder 19. The spring piece 24 is electrically connected to one of electrodes of the power supply circuit through a leadwire 26. Thus, the brush holder 19 is configured so that the brush bodies 22a and 23a of both the brushes 20a and 21a are electrically connected in common to one of the electrodes of the power supply circuit. Further, similarly, the other 20b of the paired first brushes 20 and the other 21b of the paired second brushes 21 respectively have brush bodies 22b and 23b, each of which is attached to a corresponding one of both ends of an elongated spring piece 25 having a central part securely fixed along the inner wall surface of the brush holder 19. The spring piece 25 is electrically connected to the other electrode of the power supply circuit. Thus, the brush holder 19 is configured so that the brush bodies 22b and 23b of both the brushes 20b and 21b are electrically connected in common to the other electrode of the power supply circuit. Each of the spring pieces 24 and 25 is bent in such a way as to push a corresponding one of pairs of the brush bodies 22a and 23a, and 22b and 23b to the commutator 17. Thus, the brush holder 19 maintains a state in which the pairs of brush bodies of the first and second brushes 20 and 21 contact with the commutator 17 in such a way as to sandwich the commutator 17 from opposite directions.

Figure 3A:
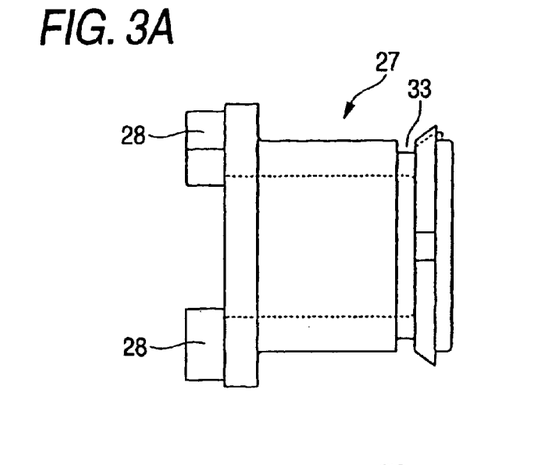
FIGS. 3A, 3B, and 3C are side views each illustrating a rotating operation part, a left-side front view thereof, and a right-side front view thereof, respectively.
Figure 3B:
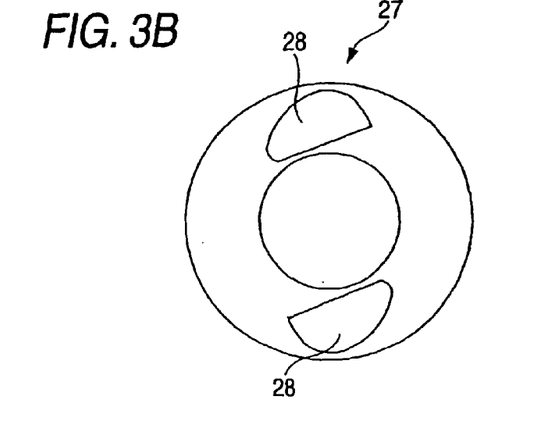
Figure 3C:
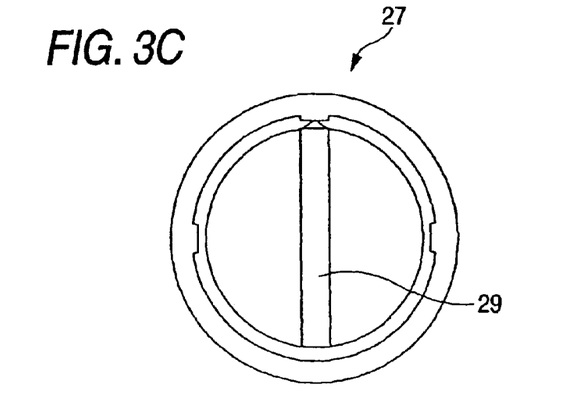

Next, a part of the present invention corresponding to the brush exchanging mechanism is described hereinbelow. In FIG. 1, reference character 27 designates a portion corresponding to the "rotary body" of the second aspect. As shown in FIG. 3A, this portion is formed like a cylinder, which is opened at an end side, in entirety thereof. Paired cam projections 28, 28 (corresponding to the "projections" of the second aspect) are provided in such a way as to project to the opened side of this portion (see FIG. 3B). On the other hand, a groove 33 for turnably placing the rotary body 27 in a through hole in a case for the electric drill 1 is formed in a circumferential part of the closed side thereof. Moreover, a groove part 29, into which, for instance, an end part of a slotted screwdriver can be inserted, is formed in the end face of the closed side thereof. Further, as illustrated in FIG. 2, the paired cam projections 28, 28 are passed through the endplate 12 of the motor 10. Furthermore, paired guide grooves 30, 30 enabling the rotary body 27 to turn within a predetermined range along the direction of the circumference of the rotation shaft 15 are formed in such a way as to penetrate through the end plate 12. Thus, only by inserting, for instance, a slotted screwdriver into a groove part 29 and performing a turning operation, the paired cam projections 28, 28 are turned along the guide grooves 30, 30 within the predetermined range.

Further, as illustrated in FIG. 1, the lengths of the paired cam projections 28, 28 passed through these paired guide grooves 30, 30 are adjusted so that the end parts of the cam projections 28, 28 contact with inner sides of longitudinal side parts of the spring pieces 24 or 25 of the first brush 20 and the second brush 21, respectively. FIGS. 1 and 2 illustrate a state (corresponding to the "first state" of the first aspect) in which the spring piece part of the second brush 21 is engaged with an end portion of each of the cam projections 28, 28 by simultaneously elastically deforming the spring piece part of the second brush 21 against a pushing force thereof. With such a configuration, as described in the following description of an operation, the first brush 20 can be exchanged to the second brush 21 by causing the rotary body 27 to perform a turning operation.

Figure 4A:
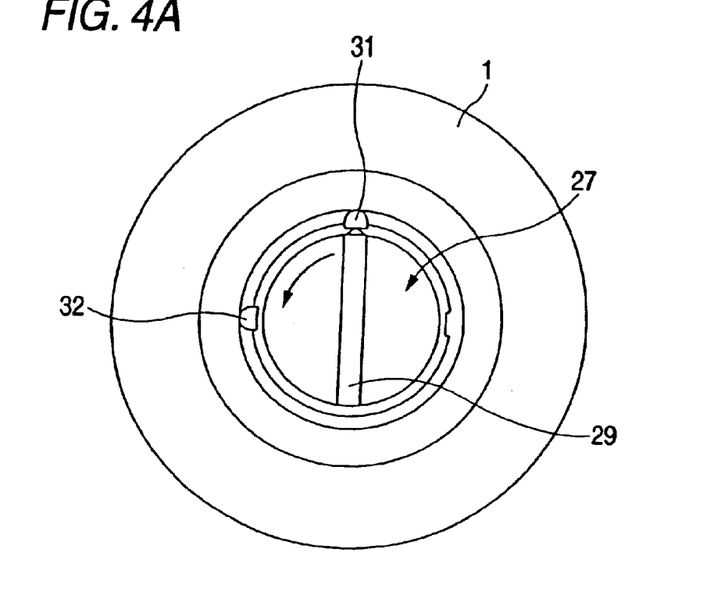
FIGS. 4A and 4B are front views each illustrating a turning operation of a rotary body.
Figure 4B:
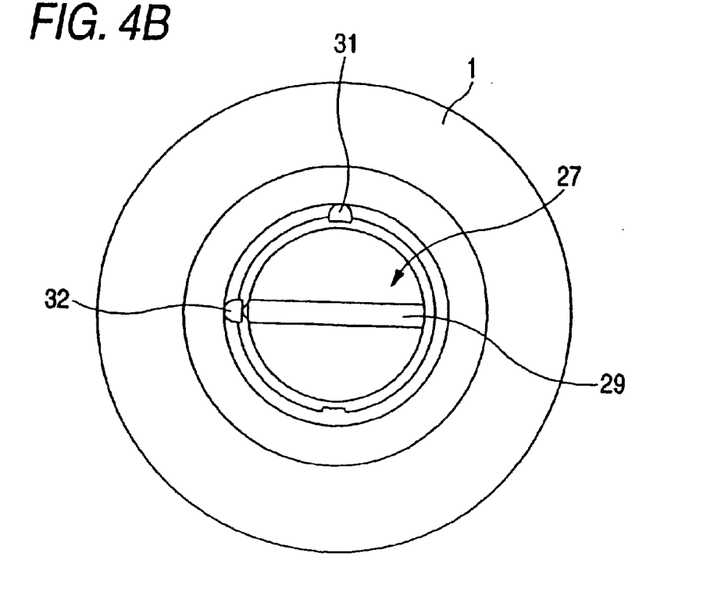

Incidentally, as illustrated in FIGS. 4A and 4B, two spot parts 31 and 32 are provided along the circumferential edge part of the through hole in the case for the electric drill 1. As shown in FIG. 4A, the groove part 29 is adjusted to the spot part 31, so that the motor 10 can be put into the first state. On the other hand, as illustrated in FIG. 4B, the groove part 29 is adjusted to the spot part 32, so that the motor can be put into a state (corresponding to the "second state" of the first aspect) in which the first brushes 20 go away from the surface of the commutator 17, while the second brushes 21 contact with the surface thereof. Therefore, the motor 10 can be reliably brought into the first state and the second state by causing the rotary body 27 to perform a turning operation so that the groove part 29 is adjusted to the spot parts 31 and 32.

Next, an operation of this embodiment of the aforementioned configuration is described hereinbelow.

Figures 5A, 5C:
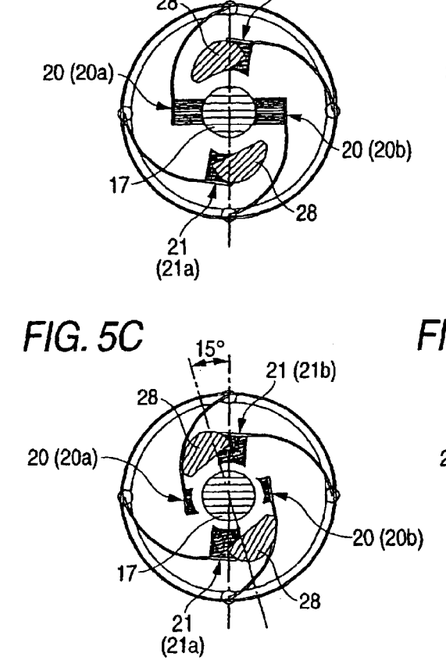
FIGS. 5A to 5F are schematic views each illustrating an operation of each of a cam projection and a brush.
Figure 5B:
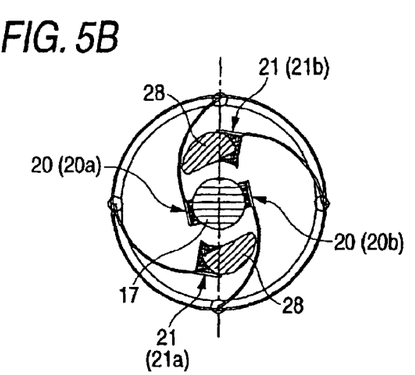
Figure 5D:
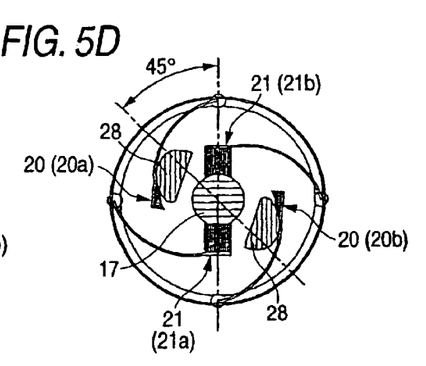

First, FIG. 5A shows the first state. In this state, as shown in this figure, only the first brushes 20 are in contact with the commutator 17. The second brushes 21 are held by the cam projections 28, 28 in a state in which the second brush 21 is detached from the commutator 17. Sparks are generated between the commutator 17 and each of the brush bodies 20a and 20b of the first brushes 20 by repeatedly performing start/stop operations on the electric drill 1 during this state. Thus, actually, the brush bodies 20a and 20b come to wear. When abrasion progresses still more, a projecting portion of each of the cam projections 28, 28, which portion protrudes at the side of the first brush 20, contacts with the spring piece part of the first brush 20 as illustrated in FIG. 5B. Thus, each of the projecting portions prevents the corresponding one of the first brushes 20 from further approaching the commutator 17 therefrom still more (incidentally, this configuration corresponds to that of the third aspect). Thus, before excessively worn out, each of the brush bodies 20a and 20b is prevented from coming into contact with the commutator 17. Consequently, the commutator 17 can be prevented from being broken.

Then, a turning operation is started by inserting a slotted screwdriver into the groove portion 29 of the rotary body 27. Thus, as illustrated in FIG. 5C, the cam projections 28, 28 start to turn. A part, at which each of the cam projections 28, 28 contacts with the spring piece part of the first brush 20, gradually moves to a tip end of the first brush 20. Consequently, the spring part of each of the first brushes 20 is gradually and elastically deformed in a direction in which the brush bodies 20a and 20b placed thereat go away from the commutator 17. Then, in the case that the turning operation is continued still more, an end of each of the second brushes 21 comes off a corresponding one of the cam projections 28, 28, so that the brush bodies 21a and 21b thereof contact with the surface of the commutator 17 (see FIG. 5D). Incidentally, the curved part of each of the cam projections 28, 28 is formed in such a way as to be constituted by a gentle slope. Similarly, the spring piece part of each of the brushes 20 and 21 is formed so as to have a gently curved shape. Therefore, the brush bodies 21a and 21b of the second brushes 21 gradually approaches the commutator 17. Consequently, shock is prevented from being caused when the brush bodies 21a and 21b contact with the commutator 17. Hence, the breakage of the commutator 17 can be prevented.

Figure 5E:
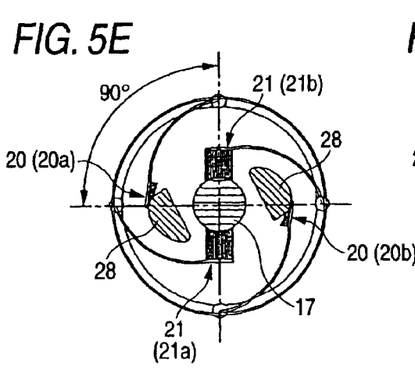
Figure 5F:
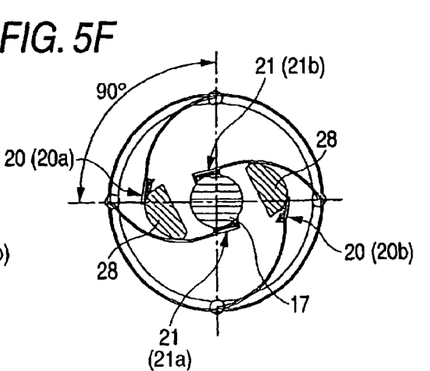

Further, as described above, by causing the rotary body 27 to perform a turning operation until the groove part 29 thereof is adjusted to the spot part 32 provided on the case for the electric drill 1. As indicated in FIG. 5E, the motor is put into the second state in which the first brushes come away from and the second brushes contact with the surface of the commutator. Then, sparks are generated between the commutator 17 and each of the brush bodies 21a and 21b of the second brush 20 by repeatedly performing start/stop operations on the electric drill 1 during this state a predetermined number of times. Thus, actually, the brush bodies 21a and 21b of the second brush 21 come to wear. In this case, similarly with the case that the first brushes 20 wear, a projecting portion of each of the cam projections 28, 28, which portion protrudes at the side of the corresponding first brush 21, contacts with the spring piece part of the second brush 21. Thus, the second brush 21 is prevented from approaching the commutator still more. Moreover, before excessively worn out, each of the brush bodies 21a and 21b is prevented from coming into contact with the commutator 17. Consequently, the commutator 17 can be prevented from being damaged.

Thus, the second brushes 21 are provided for reserve, in addition to the first brushes to be used during an initial phase. Further, the exchanging mechanism enables the exchange of the first brushes 20 to the second brushes 21. Consequently, even when the first brushes 20 wear out, the motor 10 can be used without interruption, by exchanging the first brush 20 with the second brushes 21 by the use of the exchanging mechanism without performing an operation of exchanging of the motor 10 itself. Thus, the present invention enables the continuing use of the motor for a long term that is longer than that for which the aforementioned conventional brush-equipped motor is used.

Further, the exchanging mechanism is configured in such a way as to cause the rotary body 27 to perform a turning operation thereby to turn a pair of the cam projections 28, 28 provided at the opened side thereof, so that the first state is changed to the second state. Thus, such an exchanging operation can be achieved by performing the turning operation of the rotary body 27, which is an extremely simple operation.

Furthermore, the motor of the present invention is configured so that when the abrasion of each of the brush bodies 20a, 20b, 21a, and 21b progresses still more in the first and second states, the projecting portion of each of the cam projections 28, 28 contacts with the spring piece part of a corresponding one of the first brushes 20 and the second brushes 21 to thereby prevent the brushes from approaching the commutator 17. Thus, before excessively worn out, the brush bodies 20a, 20b, 21a, and 21b are prevented from coming into contact with the commutator 17. Consequently, the commutator 17 can be prevented from being damaged.

The present invention is not limited to the aforementioned embodiment. For example, embodiments described in the following description are included in the technical scope of the present invention. Further, various modifications and changes of the embodiments of the present invention may be made without departing from the gist of the present invention.

(1) Although the paired second brushes 21 are provided as the reserve-brushes in the aforementioned embodiment, the present invention is not limited thereto. A plurality of pairs of reserve-brushes may be provided in the motor and exchanged in sequence therein.

(2) Although the first state is changed to the second state by turning the rotary body to thereby integrally move the first and second brushes 20a and 21 in the aforementioned embodiment, the brushes 20 and 21 may be moved by providing a rotary body dedicated to each of the brushes and causing each of such rotary bodies to perform a turning operation.

(3) Although the cam projections are employed as the parts each corresponding to the "projection" of the second aspect in the aforementioned embodiment, the present invention is not limited thereto. Such a part may be shaped like a bar, as long as a side portion of the spring piece part of each of the brushes 20 and 21 can be caught by the part corresponding to the "projection" of the second aspect. Incidentally, in the case that each of the parts corresponding to the "projection" of the second aspect has a cam shape, each of the brush bodies 22a, 22b, 23a, and 23b can be made to slowly contact with the commutator 17, and thus the present invention has effects in that the commutator 17 can be prevented from being damaged.

(4) Although the brushes 20 and 21 are configured so that the brush bodies 22a, 22b, 23a, and 23b are attached to the spring pieces 24 and 25, the present invention is not limited thereto. The brush bodies maybe other elastic pieces, as long as such elastic pieces can be elastically deformed.

(5) Although the aforementioned embodiment is configured so that the turning operation is performed by inserting a slotted screwdriver into the groove part 29 provided in the rotary body, the present invention is not limited thereto. For instance, a gripping part may be provided in the closed part side of the rotary body, and a turning operation may be performed by gripping the gripping part by hand. Incidentally, in the case that the motor of the present invention has the configuration of the aforementioned embodiment, it is necessary to use a slotted screwdriver so as to turn the rotary body. Thus, the aforementioned embodiment can solve the problem in that when the first brushes 20 can be fully used and thus there is no need for exchanging the brushes, the rotary body is turned.

(6) Although the case of applying the present invention to the electric drill 1 has been described in the foregoing description of the embodiment, generally, the effects of the present invention can be obtained in the case of applying the present invention to each electric equipment, such as an electric screwdriver, to which a brush-equipped motor can be applied.

(7) Although the aforementioned embodiment is configured so that the projection provided in the rotary body moves in a circumferential direction of a concentric circle of a section of the rotation shaft as the rotary body turns. However, the motor may be configured so that the projection provided in the rotary body linearly moves.

(8) Although the aforementioned embodiment is configured so that the brushes and the reserve-brushes are alternately arranged in a circumferential direction of a concentric circle of a section of the rotation shaft, the brushes and the reserve-brushes may be arranged in an axial direction of the rotation shaft. Further, in this case, it is preferable that a plurality of the reserve-brushes are arranged, and that the commutator is extended in the axial direction of the rotation shaft correspondingly to the plurality of the reserve-brushes.

(9) Although the aforementioned embodiment is configured so that the brushes and the reserve-brushes are alternately arranged in a circumferential direction of a concentric circle of a section of the rotation shaft and slidably contacted with the same part of the commutator with which the brushes and the reserve-brushes are slidably contacted, the brushes and the reserve-brushes may be arranged in the circumferential direction of a concentric circle of the rotation shaft in such a way as to be offset in an axial direction of the rotation shaft. Consequently, when the reserve-brushes are slidably contacted with the commutator, the reserve-brushes can slidably contact with a position on the commutator, which position differs from the position thereon to be slidably contacted by the brushes.

(10) Although unit for notifying brush exchanging timing is not specified in the foregoing description of the aforementioned embodiment, the motor may be provided with a detection unit for detecting that the brushes wear, so that an operator is notified of the brush exchanging timing. The detection unit may be configured so that a drop of the level of an in rush current at the time of starting the motor is measured, and that when the level of this inrush current is lower than a predetermined value, it is determined to be a time at which the brushes should be exchanged.

Further, although the turn of the rotary body is manually operated by using the screwdriver, a unit for electrically driving and turning the rotary body according to the brush exchanging timing detected by the detection unit may be attached to the motor.

What is claimed is:

1. A brush-equipped motor, comprising:
    a rotor;
    a commutator provided at a side of the rotor;
    a stator provided around the rotor;
    a brush provided at a side of the stator;
    a reserve-brush provided at the side of the stator; and
    a brush exchanging mechanism having
        a projection, and
        a rotary body adapted to perform a turning operation,
    wherein a state of the brush-equipped motor is changed from a first state in which the brush is in contact with the commutator and the reserve-brush is spaced apart from the commutator, to a second state in which the brush is spaced apart from the commutator and the reserve-brush is in contact with the commutator, by the turning operation of the rotary body,
    wherein, the projection detaches the brush from the commutator by the turning operation.

2. The brush-equipped motor as set forth in claim 1, wherein the rotary body is adapted to perform a turning operation concentrically with the rotor.

3. The brush-equipped motor as set forth in claim 1, wherein the brush exchanging mechanism has a plurality of projections and each of the projections is in contact with the brush in the second state and the reserve-brush in the first state.

4. The brush-equipped motor as set forth in claim 1, wherein the projection is provided on the rotary body.

5. A brush-equipped motor, comprising:

a rotor;

a commutator provided at a side of the rotor;

a stator;

a brush provided at a side of the stator;

a reserve-brush provided at the side of the stator: and a brush exchanging mechanism having a projection, wherein the brush exchanging mechanism changes the brush-equipped motor from a first state in which the brush is in contact with the commutator and the reserve-brush is detached from the commutator by the projection, to a second state in which the brush is detached from the commutator by the projection and the reserve-brush is in contact with the commutator, wherein each of the brush and the reserve brush has a brush body for slidably contacting with the commutator, wherein the brush exchanging mechanism has a rotary body adapted to perform a turning operation, and a state of the brush-equipped motor is chanted from the first state to the second state by turning the rotary body, wherein in the first state, reserve-brush contacts with the projection to thereby prevent the brush body thereof from being in contact with the commutator, and in the second state, the brush contacts with the projection to thereby prevent the brush body thereof from being in contact with the commutator.

6. The brush-equipped motor as set forth in claim 5, wherein in the first state, brush contacts with the projection to thereby regulate an amount of displacement brush body to the commutator side, which is caused by wear of the brush body thereof, and in the second state, reserve-brush contacts with the projection to thereby regulate an amount of displacement of the brush body to the commutator side, which is caused by wear of the brush body thereof.

7. The brush-equipped motor as set forth in claim 5, wherein the brush and/or the reserve-brush have an elastic piece attached to the brush body and arranged in a circumferential direction of the commutator.

8. The brush-equipped motor as set forth in claim 7, wherein the projection is in contact with the elastic piece of the brush in the second state and the reserve-brush in the first state.

9. The brush-equipped motor as set forth in claim 5, wherein the rotary body is adapted to perform a turning operation concentrically with the rotor.

10. The brush-equipped motor as set forth in claim 5, wherein the brush exchanging mechanism has a plurality of projections and each of the projections is in contact with the brush in the second state and the reserve-brush in the first state.

11. The brush-equipped motor as set forth in claim 5, wherein the projection is provided on the rotary body.

12. A brush-equipped motor, comprising:

a rotor;

a commutator provided at a side of the rotor;

a stator;

a brush provided at a side of the stator;

a reserve-brush provided at the side of the stator; and a brush exchanging mechanism having a protection, wherein the brush exchanging mechanism changes the brush-equipped motor from a first state in which the brush is in contact with the commutator and the reserve-brush is detached from the commutator by the projection, to a second state in which the brush is detached from the commutator by the projection and the reserve-brush is in contact with the commutator, wherein the projection has a cam shape having a surface contacting with the brush in the second state and the reserve-brush in the first state and constituted by a curved part.

13. The brush-equipped motor as set forth in claim 12, wherein the curved part has a gentle gradient.

* * * * *